Patented Apr. 24, 1951

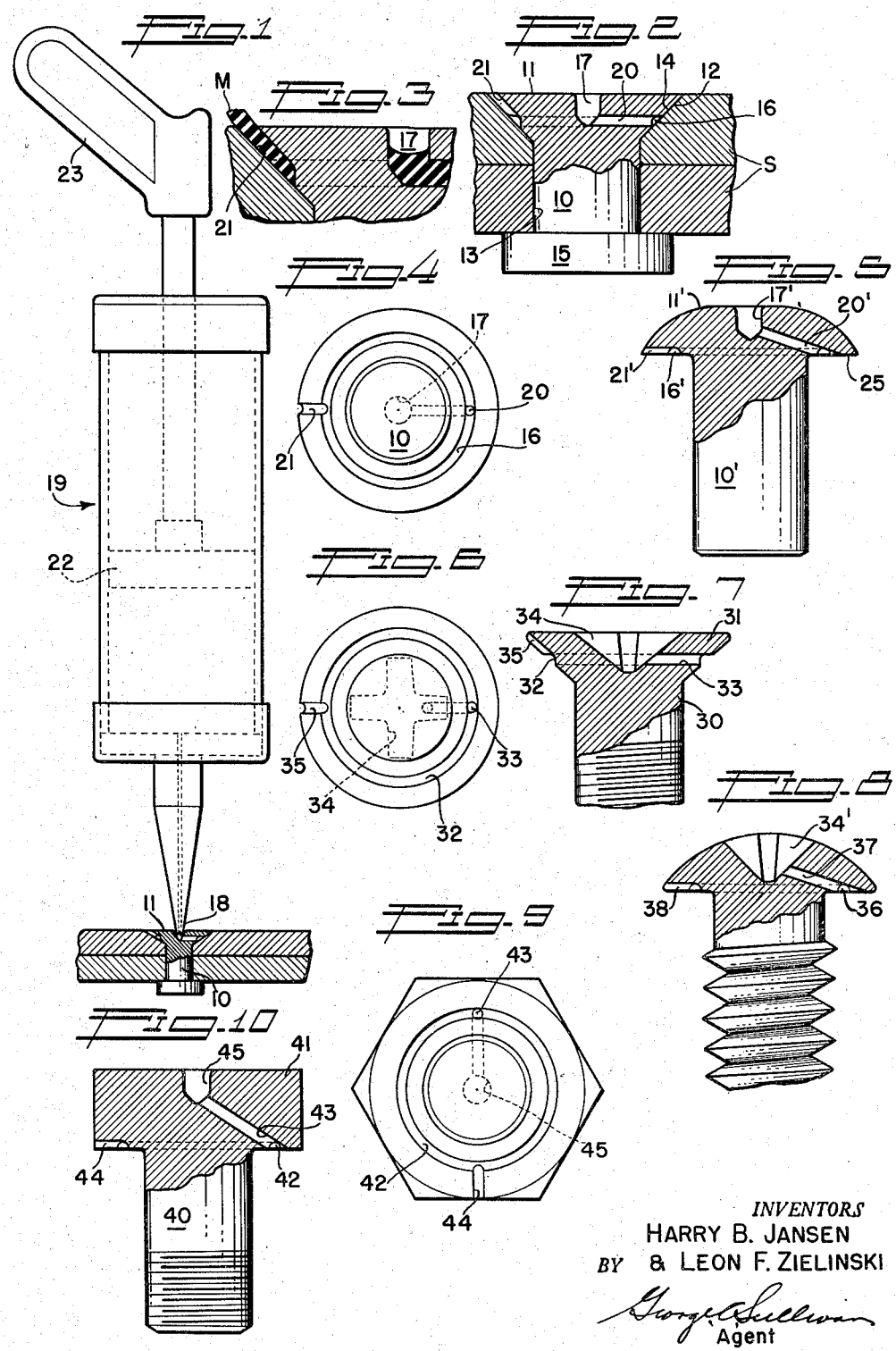

2,550,357

UNITED STATES PATENT OFFICE 2,550,357

SEALABLE FASTENING DEVICE

Harry B. Jansen and Leon F. Zielinski, Glendale, Calif., assignors to Lockheed Aircraft Corporation, Burbank, Calif.

Application March 30, 1945, Serial No. 585,724

12 Claims. (Cl. 85—9)

This invention relates to securing and fastening devices, and relates more particularly to rivets, bolts, screws and similar fastening elements embodying sealing means for preventing the leakage of fluid around or past the elements.

In the fabrication of tanks, containers and compartments it is frequently a difficult problem to provide tight, satisfactory leak-proof joints or connections between the component parts. Where it is necessary to employ rivets, bolts or the like, to connect the parts there is a tendency for leaks to develop around or at the rivets or bolts, this being particularly true where the structure is subject to vibration and varying load conditions. For example, in aircraft construction where portions of the wings are utilized as "integral" fuel and oil tanks, and where the cabin or fuselage is pressurized for high altitude flight, it has been found practically impossible to prevent the development of leaks at the conventional riveted and bolted connections. In such situations it has been found necessary to attempt to seal the tanks by applying sealing compounds over the internal surfaces of the tank wall and by employing special caulking material at the joints and between the faying surfaces. The sealing of the tanks by internally applied sealing materials is very costly, adds materially to the weight of the structure, and has not proved entirely satisfactory. Rivets and similar securing devices have been introduced which embody gaskets or layers of sealing material applied to the under surfaces of the rivet heads. Such devices are not satisfactory because the gasket or sealing material prevents or interferes with metal-to-metal contact between the rivet head and the tank surface, and a poor structural connection results.

It is a general object of the present invention to provide a simple, practical securing device in the form of a rivet, bolt, screw, or the like, incorporating means for obtaining and preserving a fluid-tight seal with the container or tank part to which it is applied, while maintaining direct metal-to-metal engagement between the tank part and the head of the securing device. The sealing means which characterizes the device of this invention does not depend for its operation or effectiveness upon the driving or tightening down of the device and does not in any way interfere with the positive direct engagement of the device with the tank or structural part with which it is associated, and therefore does not affect the strength of the structural connection thus obtained.

Another object of the invention is to provide a fastening or securing device of the class referred to, designed for the reception of sealing material subsequent to driving or installation for the purpose of providing a fluid-tight seal, or for repairing or remedying a leak which may develop during the use of the container or compartment. The device of this invention is thus capable of employment in either of two optional manners. In accordance with one method the device is driven or otherwise installed in the usual way, and shortly thereafter the sealing material is introduced into the device to provide a fluid-tight seal. In the other mode of use the device is driven or installed in the usual manner and the normal engagement of the device or rivet shank with the tank part is depended upon to provide the seal. In the event a leak develops the sealing material is then introduced into the rivet or device to provide a new seal and thus repair the leak. In either mode of procedure the sealing material may be injected into the device two, three or more times as conditions require, to maintain a leak-tight seal throughout the service life of the container. Accordingly, it is unnecessary to remove and replace the device in the event a leak develops, or to drain or otherwise remove the contents of the tank, and a leak may be stopped immediately at nominal cost. This feature is of particular importance in the servicing of aircraft, and the like.

Another object of the invention is to provide a rivet, screw, bolt, or like device, which is constructed to receive sealing material introduced under pressure and designed to retain the material in place and in a condition to preserve a dependable fluid-tight seal. The device may be constructed to be installed by a rivet gun, screw driver or wrench, in the usual manner, and is ported and channeled to receive the sealing material introduced under substantial pressure, and to retain the material thus introduced to maintain an effective, continuous annular zone of sealing engagement between the material and the opposing surfaces of the device and container part. The construction is such that an uninterrupted annular bead or gasket is formed when the sealing material is introduced. Further, the construction provides a signal or "telltale" which informs the operator when this annular gasket has been completed, and in the event the rivet or device is loose or improperly installed, an indication is given so that the faulty device may be replaced if desired.

A further object of the invention is to provide a securing device of the character referred to that may be installed and serviced, or sealed, from the exterior of the tank or compartment, thus simplifying both the installation and servicing procedures.

Other objectives and features of the invention will become apparent from the following detailed description of typical preferred forms of the invention illustrated in the accompanying drawings wherein:

Figure 1 is a sectional view illustrating an installed rivet of the invention and showing a sealing material injecting gun in place at the rivet;

Figure 2 is an enlarged sectional view of the rivet illustrated in Figure 1 with a portion of the rivet appearing in side elevation;

Figure 3 is an enlarged fragmentary sectional view of the rivet of Figure 1 illustrating the manner in which the sealing material occupies the channel and extends from the rivet head;

Figure 4 is an end view of the rivet removed from the tank parts;

Figure 5 is a sectional view of another form of rivet of the invention with a portion appearing in side elevation;

Figure 6 is an end elevation of the screw provided by this invention and illustrated in Figure 7;

Figure 7 is a fragmentary sectional view of the screw of Figure 6;

Figure 8 is a sectional view of another screw provided by this invention with a portion appearing in side elevation;

Figure 9 is an end view of a bolt of the invention; and

Figure 10 is a sectional view of the bolt shown in Figure 9 with a portion appearing in side elevation.

The present invention is capable of embodiment in attaching and connecting devices of various types and is useful in widely differing situations. We will herein describe the several typical embodiments illustrated in the accompanying drawings, it being understood that these forms of the invention are merely illustrative and are not to be construed as limiting either the scope or application of the invention.

In Figures 1 to 4 we have illustrated a rivet comprising a body or shank 10 and a head 11. Prior to installation and driving, the shank 10 is a simple cylindrical part of uniform diameter throughout. As is customary in this class of device, the head 11 is integral with the shank 10 and is a simple enlargement at the outer end of the shank. The head 11 is of the countersunk type having a flat normal outer end surface and a tapering or frusto-conical undersurface 12 extending from the periphery of the head to the root of the shank 10. In Figure 2 the rivet is associated with two parts or sheets S of a container, or the like, the shank 10 being engaged in openings 13 in the sheets. The outer sheet S is provided with a tapered countersink or recess 14 to receive the head 11 so that the outer surface of the rivet head is flush with the outer surface of the sheet. The rivet is shown headed-up or driven, having an upset head 15 at its inner end engaging the inner surface of the inner sheet S. The structure thus far described is conventional.

In accordance with the invention, the rivet or more specifically, its head 11, is ported and channeled for the reception of sealing material and to maintain an annular body of the material for sealing between the head and the outer sheet S. An annular groove or channel 16 is provided in the under side of the head 11 to contain the annular sealing body. The channel 16 is formed in the surface 12 and it is preferred to space the channel substantially midway between the root of the shank 10 and the outer periphery of the head 11. However, in certain applications of the invention, it may be preferred to provide the groove at or adjacent the root of the shank. While the channel may be of any desired cross sectional configuration, we have shown it defined by a curved concave wall. It will be observed that the channel 16 has a rather wide mouth or side, facing or opposing the wall of the recess 14 in the outer sheet S.

The head 11 is further provided with means to introduce or facilitate the introduction of the sealing material to the channel 16. This means includes a depression or socket 17 in the upper side of the rivet head. The socket 17 is preferably, though not necessarily, centrally positioned in the outer end of the head and is intended to receive the discharge nozzle 18 of an applicator or pressure gun 19. The bottom wall of the socket 17 is preferably concave so that it does not obstruct the end of the nozzle 18 when the sealing material is being forced into the rivet passages. At least one lateral or radial port 20 extends through the rivet head 11 from the socket 17 to the channel 16 to conduct the sealing material from the nozzle of the gun 19 to the channel. The port 20 is preferably of uniform diameter and of sufficient capacity to freely pass the sealing material.

The invention further provides means for assuring the free uniformly distributed delivery of the sealing material to the channel or groove 16. This means comprises a vent port 21 extending from the channel 16 to the outer end of the head 11. We have found it desirable to make the port 21 in the form of a notch or groove in the under surface 12 of the head. The port or groove 21 extends outwardly from the channel 16 to the outer end of the head 11 where it is open to the atmosphere. As best illustrated in Figure 4, the port 21 is diametrically opposite the point of communication of the port 20 with the channel 16. The port 21 permits the free displacement of air from the port 20 and the channel 16 during the introduction of the sealing material so that the material may freely flow into and completely occupy the channel. Upon reaching the port 21 the material flows outwardly therethrough to extend from the head of the rivet. The appearance of the sealing material at the end of the rivet informs the operator that the sealing channel 16 is properly filled.

In employing the rivet of Figures 1 to 4, the shank 10 is introduced into the openings 13 and the rivet is driven in the usual manner by a riveting device, gun or hammer. The driving of the rivet expands the shank 10, providing tight sealing engagement between the shank and the walls of the openings 13. If desired, this engagement may initially be relied upon to maintain the fluid seal at the rivet. In the event a leak develops at the rivet during subsequent use of the tank or apparatus, the sealing material is injected into the rivet to cure the leak and to assure a continued seal at the rivet. If desired, sealing material may be injected into the rivet following its driving and prior to actual use of the tank or apparatus.

In introducing the sealing material, either to cure a leak at a rivet, or to provide the initial seal, the gun 19 carrying a quantity of the sealing material M is arranged to have its nozzle 18 engage the socket 17. The piston or plunger 22 of the gun 19 is then operated by means of the handle 23 to expel a quantity of the sealing material under pressure. The sealing material M under pressure is forced through the port 20 to the annular channel 16 and flows circumferentially in opposite directions from the port. The material flows through the channel 16 until it reaches the vent port 21, whereupon it flows outwardly through the port 21. The viscosity of the material and the capacity of the groove 16 and port 21 are related to assure complete, dense filling of the groove before the material extrudes through the port 21. Figure 3 illustrates the manner in which the material M will flow outwardly through the port 21 to appear at the outer end of the rivet 11. The appearance of the material M at the end of the port 21 informs the operator that the sealing groove 16 has been completely filled with the sealing material under pressure. The material in the groove 16 seals between the head 11 and the wall of the socket 14, thus providing an annular fluid-tight seal around the head of the rivet.

The sealing material M employed in the device or rivet, should be of a character to successfully and permanently seal off the particular liquid or gas contained in the tank or compartment, and the invention contemplates the use of any selected or required sealing material. For example, where the rivet is to be employed in the fuel tank of an airplane utilizing aromatic fuel, it is preferred to use a sealing material such as a mixture or compound of synthetic rubbers modified to have the required adhesion to the metal and the required flow characteristics. A mixture of thiokol, buna N-acrylonitrile rubber and an alkyd type resin has been found to be practical in such a situation. It is usually desirable to employ a viscous material that will remain sufficiently plastic during the life of the tank or apparatus to permit resealing of the rivet. Furthermore, it is advantageous to employ a material that swells slightly when in contact with the liquid or gas and that has some adhesion to the metal surfaces, but which is not attacked, soluble in, or otherwise adversely affected by the fluid contained in the tank. In the event a leak develops at the rivet by reason of vibration, relative working of the parts, or excessive tank pressures, the rivet may be quickly and easily resealed by merely introducing an additional quantity of the sealing material. This resealing of the rivet may be performed from the exterior of the tank or compartment and does not require draining of the tank or replacement of the rivet.

Figure 5 of the drawings illustrates the invention applied to a round head rivet having a shank 10' and a head 11'. In this form of the invention the head has a flat undersurface 25 for contacting the outer sheet S and the annular sealing groove 16' is formed in this surface. The groove 16' is preferably spaced outwardly from the shank 10' so that the sealing material contained in the groove is remote from the openings 13 in the sheets S. A central socket 17' is provided in the rivet head to receive the nozzle or tip 18 of the sealing material applicator or gun 19, and a sloping port 20' extends from the lower end of the socket to the sealing groove 16'. A vent or exit port 21' extends from the groove to the external surface of the rivet head. The port 21' is preferably diametrically opposite the port 20' and may be in the form of a simple notch or groove extending through the flat undersurface of the rivet head from the groove 16' to the periphery of the head. The fastening device or rivet of Figure 5 is employed in the same manner as the above described rivet of Figures 1 to 4 inclusive.

The invention is capable of embodiment in screws of various types, and in Figures 6, 7 and 8 we have shown two typical forms of structural screws constructed in accordance with the invention. The screw of Figures 6 and 7 has a body or shank 30 provided with the usual thread. The head 31 of the screw is of the countersunk type having a flat outer end and a tapered or frustoconical lower surface. The slot or socket 34 in the head of the screw is substantially cross-shaped to receive a correspondingly shaped screw driver bit. The under side of the head 31 has a sealing material-receiving groove 32 similar to the above described groove 16 which is spaced between the root of the shank 30 and the periphery of the head. The groove 32 is annular and is preferably of uniform capacity throughout its length. A substantially radially extending port 33 connects the groove 32 with one arm of the cross-shaped slot 34. It is to be noted that the inner end of the port 33 is readily accessible by the nozzle of the material injecting gun 19 which may be entered into the slot 34. It may be found desirable to provide the gun 19 with a special adaptor or nipple for conforming to the cross-shaped slot 34.

The screw head is further provided with a vent passage 35 to permit the escape of air from the groove 32 and port 33, and to assure the uniform distribution of the sealing material throughout the entire length of the groove. The vent passage 35 is diametrically opposite the port 33 and extends outwardly in the undersurface of the head from the channel 32 to the top of the screw head. The screw of Figure 8 is of the round head type and its head is provided with a cross-shaped screw driver socket or slot 34'. An annular groove 36 for receiving the sealing material is provided in the undersurface of the head and a port 37 extends diagonally from the slot 34' to the groove. A vent passage 38 extends from the groove 36 to the edge of the head and is preferably diametrically opposite the port 37.

In employing the screws of Figures 6, 7 and 8, the screws may be driven in the usual manner to bring the under sides of their heads into direct contact with the work parts. Subsequent to the driving of the screws they may be sealed to prevent the leakage of fluid from around the shanks and heads. To seal the screws it is merely necessary to introduce the nozzle tip 18 or the aforementioned special nozzle of the material injecting gun 19 into their respective sockets or slots 34, 34' and then operate the handle 23 of the gun. The sealing material thus injected through the screws flows into the ports 33 or 37 into the annular channels 32 or 36. The sealing material flows through the annular grooves until it reaches the vent ports 35 or 38 and ultimately discharges from the heads of the screws. The discharge of the sealing material from the vent ports informs the operator that the screws have been properly sealed. The screws may be resealed from time to time as may be required in the same manner as the above described rivets.

The invention is also useful in connection with bolts and similar securing devices. Figures 9 and 10 illustrate a bolt constructed in accordance with the invention. The bolt has the usual threaded shank 40 and a polygonal head 41. The means for receiving the sealing material includes an annular channel or groove 42 in the flat under face of the bolt head. The groove 42 is spaced outwardly from the root of the bolt shank. A substantially central socket 45 is provided in the top of the bolt head and a sloping or diagonal port 43 extends from the bottom of the socket to the groove 42. A vent port 44 is formed in the under side of the bolt head 41 and extends from the annular groove 42 to the outer surface of the head. It is preferred to locate the vent port 44 substantially diametrically opposite the port 43.

In using the bolt of Figures 9 and 10 it is installed in the usual manner and tightened down by means of a nut or by threading its shank into the work part. This tightening down of the bolt brings the under side of the head 41 into direct metal-to-metal contact with the structural part. Following the tightening down of the bolt, the nozzle tip 18 of the gun 19 is introduced into the socket 45 to discharge the sealing material into the port 43. The applicator gun 19 is operated to force the sealing material under pressure through the port 43 and into the annular channel 42. The material flows through the channel 42 to completely occupy the same, and a portion of the material finally discharges through the vent port 44. The escape of this small portion of the sealing material from the port 44 informs the workman that the bolt has been properly sealed. The bolt may be resealed in the event that the leak develops by merely introducing further sealing material under pressure into the groove 42. This may be done without disturbing or further tightening the bolt.

It will be observed that in each of the several forms of the invention the sealing means does not interfere with the direct metal-to-metal contact of the sealing device with the work part surfaces. The sealing may be quickly accomplished without moving or disturbing the previously installed fastening device, and the seal may be reconditioned from time to time without the necessity of removing and replacing the device and without draining the fluid from the container.

Having described only typical forms of the invention, we do not wish to be limited to the specific details herein set forth, but wish to reserve to ourselves any variations or modifications that may appear to those skilled in the art or fall within the scope of the following claims.

We claim:

1. A sealable securing device for use with a part having an opening comprising a shank for arrangement in the opening, and a head on the shank presenting an outer end and an inner surface which engages a surface of said part when said shank is in said opening, the head having a continuous uninterrupted annual groove in its said surface in surrounding relation to the shank and spaced from both the shank and the periphery of the head, and the head having a passage leading from the outer end of the head, which is accessible when first named surfaces are in engagement, to said groove for conducting sealing material to the groove to seal between said surfaces.

2. A sealable securing device for use with a part having an opening comprising a shank for arrangement in the opening, and a head on the shank presenting an inner surface engaging a surface of said part when said shank is in said opening, the head having an uninterrupted annular groove in its said inner surface in spaced surrounding relation to the shank, having a passage leading from an exposed portion accessible outer surface of the head to said groove for conducting sealing material to the groove to seal between said surfaces, and having a vent leading from the groove at a point spaced from the point of communication of said passage with the groove.

3. A sealable securing device for use with a part having an opening comprising a shank for arrangement in the opening, and a head on the shank presenting an inner surface engaging a surface of said part when said shank is in said opening, the head having an uninterrupted annular groove in its said inner surface in spaced surrounding relation to the shank and spaced from the periphery of the head, having a passage leading from an exposed accessible outer surface of the head to said groove for conducting sealing material to the groove to seal between said surfaces, and having a vent leading from the groove at a point substantially diametrically opposite the point of communication of the passage with said groove.

4. A sealable securing device for use with a part having an opening comprising a shank for arrangement in the opening, and a head on the shank presenting an inner surface contacting a surface of said part when the shank is arranged in said opening, the head having an uninterrupted annular groove in its said inner surface in spaced surrounding relation to the shank and spaced from the periphery of the head, having a socket in its exposed outer face for receiving the discharge of a sealing material applicator, and having a port leading from said socket to the groove for conducting the sealing material to the groove.

5. A sealable securing device for use with a part having an opening comprising a shank for arrangement in the opening, and a head on the shank presenting an inner surface engaging a surface of said part when the shank is arranged in said opening, the head having a continuous annular groove in its said inner surface in spaced surrounding relation to the shank and spaced from the periphery of the head, having a socket in an exposed accessible outer face for receiving the discharge of a sealing material applicator, having a passage leading from said socket to the groove for conducting the sealing material to the groove, and having a vent channel at its said surface leading from said groove to the exposed end of the head.

6. A rivet comprising a rivet shank, and a head on the shank presenting an exposed accessible outer face and an inner work-engaging surface, the head having a continuous annular groove in said surface spaced from the shank and from the periphery of the head, and a passage leading from the outer face of the head to the groove for conducting sealing material thereto.

7. A rivet comprising a rivet shank, and a head on the shank presenting an exposed accessible outer face and an inner work-engaging surface, the head having a continuous annular groove in said inner surface spaced from the shank and from the periphery of the head, having a substantially central socket in its outer face for receiving the discharge of a sealing material applicator, and having a port leading from the socket to said groove for conducting the sealing material to the groove.

8. A rivet comprising a rivet shank, and a head on the shank presenting an exposed accessible outer face and an inner work-engaging surface, the head having an annular groove in said inner surface spaced from both the periphery of the head and from the shank, having a substantially central socket in its outer face for receiving the discharge of a sealing material applicator, having a vent passage leading from the groove to its outer face, and having a port leading from the socket to said groove for conducting the sealing material to the groove.

9. A securing device adapted to be driven by a tool comprising a shank, a thread on the shank, and a head on one end of the shank presenting an accessible outer end and an inner work-engaging face, the head having a continuous groove in said face in spaced surrounding relation to the shank and spaced from the periphery of the head, having a slot in its outer end for receiving said tool, and having a passage leading from said slot to the groove for conducting sealing material to the groove.

10. A screw comprising a shank having a thread, and a head on the shank presenting a work-engaging surface, the head having a screw driver opening, having an annular groove in said surface spaced from both the shank and the periphery of the head, having a port leading from the opening to the groove for conducting sealing material to the groove, and having a vent port leading from the groove to its outer face.

11. A bolt comprising a bolt shank, and a head on the shank presenting a work-engaging surface, the head having a continuous annular groove in said surface and having, from the periphery of the head a passage leading from another surface spaced around the shank to the groove for conducting sealing material thereto.

12. A fastening device for use with a construction including at least two parts having openings, the fastening device including a shank adapted to be engaged in the openings and a head on one end of the shank having a surface for contacting a surface of one of said parts and having an exposed accessible outer face, there being an annular space between the head and said part confined by said contacting surfaces, said space being spaced from the shank and from the periphery of the head, and a passage in the head leading from its outer face to the space, and sealing material introduced into said space through the passage and sealing between the head and said part.

HARRY B. JANSEN.
LEON F. ZIELINSKI.

REFERENCES CITED

The following references are of record in the file of this patent:

UNITED STATES PATENTS

| Number | Name | Date |
|---|---|---|
| 197,923 | Carney | Dec. 11, 1877 |
| 596,303 | O'Neill | Dec. 28, 1897 |
| 837,767 | Aims | Dec. 4, 1906 |
| 1,335,756 | Scarff | Apr. 6, 1920 |
| 1,401,757 | Brown | Dec. 27, 1921 |
| 1,504,452 | Hirst | Aug. 12, 1924 |
| 1,689,799 | Nordstrom | Oct. 30, 1928 |
| 1,826,941 | LaMont | Oct. 13, 1931 |
| 1,904,250 | Purvis | Apr. 18, 1933 |
| 1,926,834 | Campbell | Sept. 12, 1933 |
| 1,946,619 | Furman | Feb. 13, 1934 |
| 1,971,648 | Furman | Aug. 28, 1934 |
| 1,971,649 | Furman | Aug. 28, 1934 |
| 1,971,650 | Furman et al. | Aug. 28, 1934 |
| 1,974,986 | Ferlin | Sept. 25, 1934 |
| 2,035,818 | MacClatchie | Mar. 31, 1936 |
| 2,250,343 | Zigler | July 22, 1941 |
| 2,266,702 | Byers | Dec. 16, 1941 |
| 2,286,336 | Brooke | June 16, 1942 |
| 2,361,106 | Jensen | Oct. 24, 1944 |